3,119,927
ARRANGEMENT FOR RESISTANCE FLASH
BUTT-WELDING
Alfred Neukom, Dubendorf, and Hans Ulrich Neidhardt, Zurich, Switzerland, assignors to H. A. Schlatter A.G., Zurich, Switzerland
Filed Feb. 27, 1961, Ser. No. 91,768
Claims priority, application Switzerland Feb. 26, 1960
5 Claims. (Cl. 219—97)

The invention relates to an apparatus for resistance flash butt-welding conductive materials by preheating, flashing and upsetting the ends of work pieces to be welded together and is concerned more particularly with apparatus of this type which is connected to a polyphase circuit including means for providing a frequency reduction.

Arrangements of this type having a three phase circuit connection include generally a welding transformer having three primary windings, each of which is connected in series with two anti-parallel coupled ignitrons and arranged between two phase conductors of the supply circuit. In this hitherto known arrangement, the ignition pins of the ignitrons receive ignition impulses from a suitable control device which impulses are so spaced in time sequence that each half wave of the secondary current of the welding transformer is composed of rectified half waves of several phases of the polyphase current and that the frequency of this secondary current is smaller than the frequency of the polyphase current. The frequency reduction is effected for the known purpose of reducing the impedance of the secondary circuit of the welding transformer.

In this known arrangement, the properties of the secondary current composed of rectified half waves of the polyphase current and the frequency of the secondary current remain unchanged during the individual process steps of the preheating and flashing operation. That is also the case when according to a known proposal for obtaining currents of different effective values during a half wave of the secondary current not all the ignitron pairs are ignited, but only individual ignitron pairs in combination or possibly only a single pair of ignitrons.

In the arrangement according to the invention, each half wave of the voltage which generates the current that is utilized to pre-heat the work piece ends which are to be welded is composed of rectified, complete or incomplete half waves of several phases of the polyphase current and has at the end an interruption which is produced by at least a partial omission of at least one of the rectified half waves of the polyphase current. Furthermore, the voltage which generates the current utilized for flashing or burning-off the work piece ends has a higher frequency than the voltage which generates the current utilized for the pre-heating process and it has in contrast to the latter no interruption at the end of each half wave.

In this arrangement it is preferable that each half wave of the voltage which generates the current for burning-off the work piece ends is composed of rectified, complete or incomplete half waves of several phases of the polyphase current.

The butt-welding operation is effected in a known manner by preheating, flashing and upsetting the two work pieces to be welded.

It has been found that with the machine according to the invention the flashing or burning off operation is speeded up so that the work pieces may be moved together at a greater speed without having the work pieces adhere together in the burning-off process. This is apparently due to the fact that the voltage which generates the burning-off current has no interruption at the end of each half wave whereby a positive sparking away of the material is assured. The higher frequency obtained due to the correspondingly faster increase of the voltage after each passing through zero has a similar effect.

It is, therefore, an object of this invention to provide an arrangement for flash butt-welding material by preheating, flashing and upsetting the ends of the work pieces in which the speed of the welding operation is increased.

It is another object of this invention to provide an arrangement of this type in which the burning-off of the work pieces is more positive without any adhesion between the work pieces.

It is a further object of this invention to provide a flash butt resistance welding arrangement in which the voltage generated for burning-off the work pieces has a higher frequency than the voltage utilized for preheating the work pieces and has no interruption at the end of each half wave.

The objects of the invention thus generally set forth together with other objects and ancillary advantages are attained by the construction and arrangement shown by way of illustration in the accompanying drawings in which.

Figure 1:
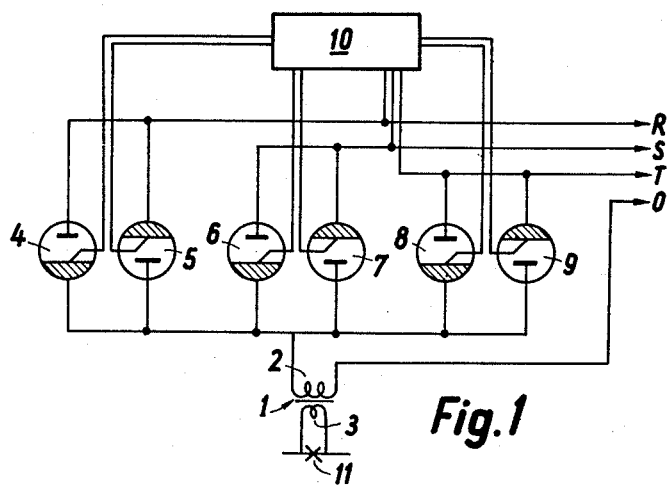
FIGURE 1 is a portion of the circuit of the flash butt resistance welding arrangement of the invention connected to a three phase circuit.

The circuit of the flash butt welding arrangement which is shown partly in FIG. 1 comprises the three phase conductors R, S, T and the neutral conductor O of a three phase alternating current. This circuit includes also a transformer 1 having a primary winding 2 and a secondary winding 3, as well as six ignitrons 4, 5, 6, 7, 8 and 9 and a suitable control device 10. The symbolically illustrated welding point is designated by numeral 11, and includes two work pieces.

Two anti-parallel coupled ignitrons 4 and 5 or 6 and 7 or 8 and 9 are connected between each of the phase conductors R, S, T, respectively, and one end of primary winding 2. The other end of primary winding 2 is connected to the neutral point O of the alternating current circuit. The ends of the secondary winding 3 lead to the two work pieces.

Figure 2:
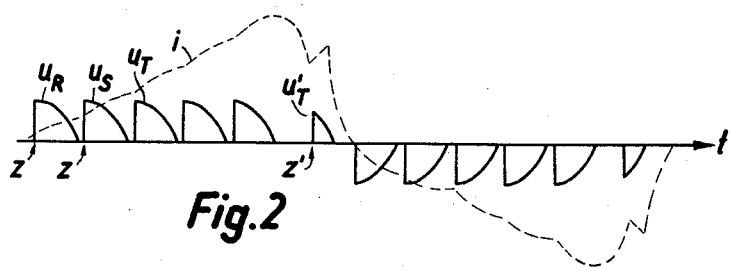
FIGURE 2 shows the time curve of a cycle of the current for preheating the work piece ends in the arrangement according to FIG. 1, and of the voltage generating this current, this voltage being composed of rectified half waves of the polyphase current.
Figure 3:
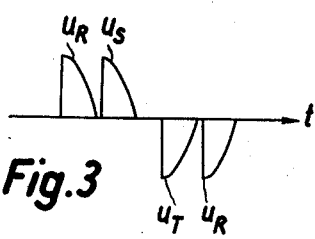
FIGURE 3 shows the time curve of a cycle of the voltage which generates in the arrangement of FIG. 1 the current which is utilized for the flashing or burning-off operation.

The ignition pin of each of the ignitrons 4, 5, 6, 7, 8 and 9 is connected to a control device 10. This control device furnishes ignition impulses for the ignitrons in such a time sequence that during the preheating each half wave of the primary voltage of transformer 1 is composed of several rectified, incomplete half waves of the star voltages of phase conductors R, S, T. Each half wave has at the end an interruption which is created by an almost complete omission of one of these half waves (FIG. 2). The control device 10 further provides that during the burning-off operation each half wave of the primary voltage of transformer 1 is composed of several rectified, incomplete half waves of the star voltage but that this primary voltage has no interruption at the end of the half wave (FIG. 3). Furthermore, the time sequence of the ignition impulses is such that the current which serves to preheat the ends of the work piece has a lower frequency than the current which is utilized for the burning-off operation. The particular variation of the time sequence of the ignition impulses takes place automatically when the apparatus makes the transition from the process step of the preheating operation to the process step of the burning-off operation.

In FIG. 2 are shown the incomplete rectified half waves of the star voltages of the alternating current circuit which are formed during the pre-heating operation at the primary winding 2 of the transformer 1, and the pre-heating current which flows in the secondary circuit 3, 11 due to these voltage half waves. Some of the voltage half waves are designated by the symbols $u_R$, $u_S$, $u_T$, $u_T'$ while the pre-heating current is designated with $i$ and the time with $t$.

It will be understood that the voltage which generates the preheating current $i$ is composed of successively starting rectified, incompletes half waves of different phases of the alternating current circuit, R, S, T, O. The letter $z$ designates a few ignition time points of the ignitrons associated with the voltage half waves. These ignition time points are so chosen that each ignitron is ignited only after the previously ignited ignitron has been extinguished. This causes the half waves to be incomplete. The ignition time point $z'$ at which the last star voltage half wave $u_T'$ of the positive preheating current half wave starts up is considerably delayed so that the resulting voltage curve presents an interruption. The ignition time point of the last star voltage half wave of the negative preheating current half wave is also correspondingly delayed. In this manner the preheating current $i$ which, due to the large inductions of the secondary circuit 3, 11 of transformer 1 increases only gradually, is given the required time for dying out in passing through zero. If in FIG. 2 the frequency of the alternating current is 50 cycles per second, the current which is utilized for the pre-heating operation has a frequency of approximately 11.5 cycles per second.

In FIG. 3 the symbols, $u_R$, $u_S$, $u_T$ designate rectified, incomplete half waves of the star voltages of the alternating current circuit R, S, T, O, and the letter $t$ designates the time. The resulting voltage, the curve of which is illustrated during one cycle, serves to generate the flashing current utilized durking flashing operation. As may be seen, the frequency of the voltage which generates the flashing current is smaller than the frequency of the pre-heating current designated by $i$ in FIG. 2. For example, if in FIG. 3 the frequency of the alternating current is 50 cycles per second, the voltage generating the flashing current has a frequency of 30 cycles per second. In contrast to the voltage curve illustrated in FIG. 2, the voltage which generates the flashing current has no interruption at the end of each half wave.

With the arrangement described above the advantages of the reduced frequency and of the voltage interruption at the end of each half wave may be completely utilized during the pre-heating process and nevertheless the undesirable sticking or adhesion of the ends of the work pieces during the burning off operation is definitely eliminated.

The transformer employed in the circuit disclosed above may also have three primary windings, each of which may be connected in series with two anti-parallel ignitrons and be arranged between two phase conductors of the supply circuit.

The foregoing is considered as illustrative only of the principles of the invention. It is not desired to limit the invention to the exact construction and operation shown and described since numerous modifications and changes will readily occur to those skilled in the art and accordingly all suitable modifications and equivalents may be applied which fall within the scope of the invention as claimed.

What is claimed is:

1. An apparatus for flash butt resistance welding by preheating, flashing and upsetting the ends of work pieces to be welded together comprising in combination a polyphase electric power source, transformer means having primary and secondary windings, ignitron means connected to said polyphase power source and to said primary winding, and ignitron control means connected to said polyphase electric power source and to said ignitron means, said ignitron control means functioning to provide at least two modes of operation, each of a different time duration to render said ignitron means successively conductive to first supply said primary winding with a first alternating voltage for producing a preheating current through said workpiece ends and subsequently with a second alternating voltage for producing a flashing current to said workpiece ends, said second alternating voltage having a frequency higher than the frequency of said first alternating voltage and each half wave of said first alternating voltage having an interruption at the end of the half wave.

2. Apparatus for flash butt resistance welding as defined in claim 1 wherein said first alternating voltage has a frequency lower than the frequency of said polyphase electric power source.

3. Apparatus for flash butt resistance welding as defined in claim 1 wherein said second alternating voltage has a frequency lower than the frequency of said polyphase electric power source.

4. Apparatus for flash butt resistance welding as defined in claim 1 wherein said second alternating voltage is composed of successive half waves with at least a part of one half wave interrupted at the end of the succession of half waves.

5. An apparatus for flash butt resistance welding as defined in claim 1 wherein said second alternating voltage is composed of successive half waves.

References Cited in the file of this patent

UNITED STATES PATENTS

| | | |
|---|---|---|
| 2,356,859 | Leathers et al. | Aug. 29, 1944 |
| 2,488,899 | Cooper et al. | Nov. 22, 1949 |